(12) United States Patent
Pocklington

(10) Patent No.: US 8,499,051 B2
(45) Date of Patent: Jul. 30, 2013

(54) MULTIPLE MESSAGING COMMUNICATION OPTIMIZATION

(75) Inventor: Richard Pocklington, Reno, NV (US)

(73) Assignee: Z124, George Town (KY)

( * ) Notice: Subject to any disclaimer, the term of this patent is extended or adjusted under 35 U.S.C. 154(b) by 145 days.

(21) Appl. No.: 13/188,335

(22) Filed: Jul. 21, 2011

(65) Prior Publication Data

US 2013/0024521 A1     Jan. 24, 2013

(51) Int. Cl.
*G06F 15/16* (2006.01)
*G06F 15/173* (2006.01)

(52) U.S. Cl.
USPC ............ 709/206; 709/223; 709/224; 709/246

(58) Field of Classification Search
USPC ...... 709/203, 206, 223, 224, 226, 246; 707/3, 707/100
See application file for complete search history.

(56) References Cited

U.S. PATENT DOCUMENTS

| | | | |
|---|---|---|---|
| 3,675,209 A | 7/1972 | Trost | |
| 4,839,453 A | 6/1989 | Chung et al. | |
| 5,553,083 A | 9/1996 | Miller | |
| 5,572,678 A | 11/1996 | Homma et al. | |
| 5,903,724 A | 5/1999 | Takamoto et al. | |
| 5,951,706 A | 9/1999 | Benner | |
| 7,031,264 B2 | 4/2006 | Adhikari et al. | |
| 7,117,308 B1 | 10/2006 | Mitten et al. | |
| 7,178,060 B2 | 2/2007 | Bamford | |
| 7,484,000 B2 | 1/2009 | Jiang | |
| 7,551,608 B1 | 6/2009 | Roy | |
| 7,675,939 B2 | 3/2010 | Kawamura et al. | |
| 7,688,867 B1 | 3/2010 | Kizhepat | |
| 7,885,264 B2 | 2/2011 | Tateno et al. | |
| 8,010,646 B2 * | 8/2011 | Bier et al. | ...................... 709/223 |
| 8,131,556 B2 * | 3/2012 | Barton et al. | ................. 709/227 |

(Continued)

FOREIGN PATENT DOCUMENTS

| | | |
|---|---|---|
| KR | 10-0547749 | 1/2006 |
| KR | 10-2006-0028961 | 4/2006 |
| KR | 10-0748900 | 8/2007 |

OTHER PUBLICATIONS

U.S. Appl. No. 13/571,668, filed Aug. 10, 2012, Jouin.

(Continued)

*Primary Examiner* — Quang N Nguyen
(74) *Attorney, Agent, or Firm* — Sheridan Ross P.C.

(57) ABSTRACT

Systems and methods for use with a communication system. A plurality of devices employing a plurality of messaging modalities may be used to send or receive message data. In any regard, message data may comprise a plurality of portions of message data in machine readable form. The plurality of portions of message data may be indexed. The indexing may include storing representations (e.g., vectors or other mathematical constructs) representing the content of the plurality of portions of message data in a message data index. The representations of the content of the plurality of portions of message data may be compared to one another to determine a relationship between the various representations. If the relationship between a first representation (e.g., a first vector) and a second representation (e.g., a second vector) exceeds a predetermined threshold, the portions of message data corresponding to the first and second vectors may be determined to be related. A notification and/or alert may be presented to a user regarding the related portions of message data. In one embodiment, the related portions of message data or messages from which the portions derive may be accessed by a user.

16 Claims, 3 Drawing Sheets

U.S. PATENT DOCUMENTS

| | | | |
|---|---|---|---|
| 8,161,175 B2 | 4/2012 | Lu | |
| 2002/0002550 A1* | 1/2002 | Berman | 707/3 |
| 2002/0110134 A1 | 8/2002 | Gracon et al. | |
| 2003/0063324 A1 | 4/2003 | Takaoka | |
| 2003/0097481 A1 | 5/2003 | Richter | |
| 2004/0221004 A1 | 11/2004 | Chalfin et al. | |
| 2005/0144416 A1 | 6/2005 | Lin | |
| 2007/0233994 A1 | 10/2007 | Huanchun | |
| 2007/0300120 A1 | 12/2007 | Kim et al. | |
| 2008/0162514 A1* | 7/2008 | Franks et al. | 707/100 |
| 2008/0201751 A1 | 8/2008 | Ahmed et al. | |
| 2009/0031092 A1 | 1/2009 | Tsumura | |
| 2010/0235701 A1 | 9/2010 | Choo | |
| 2011/0103377 A1 | 5/2011 | Hua et al. | |
| 2012/0079001 A1 | 3/2012 | Chincisan | |
| 2012/0079076 A1 | 3/2012 | Chincisan | |
| 2012/0079323 A1 | 3/2012 | Chincisan | |
| 2012/0135704 A1 | 5/2012 | Gunasekara | |

OTHER PUBLICATIONS

U.S. Appl. No. 13/571,724, filed Aug. 10, 2012, Jouin.
U.S. Appl. No. 13/571,829, filed Aug. 10, 2012, Jouin.
U.S. Appl. No. 13/571,951, filed Aug. 10, 2012, Jouin.
U.S. Appl. No. 13/572,133, filed Aug. 10, 2012, Jouin.
U.S. Appl. No. 13/187,026, filed Jul. 20, 2011, Chen.
"1G", Wikipedia, Printed at http://en.wikipedia.org/wiki/1G on Jun. 6, 2012, 2 pages.
"2G", Wikipedia, Printed at http://en.wikipedia.org/wiki/2G on Jun. 6, 2012, 4 pages.
"3G," Wikipedia, printed Jun. 6, 2012, 8 pages (found at http://en.wikipedia.org/wiki/3G).
"4G," Wikipedia, printed Jun. 6, 2012, 10 pages (found at http://en.wikipedia.org/wiki/4G).
"5G", Wikipedia, Printed at http://en.wikipedia.org/wiki/5G on Jun. 6, 2012, 3 pages.
"Bluetooth," Wikipedia, printed Jun. 8, 2012, 11 pages (found at http://en.wikipedia.org/wiki/Bluetooth).
"Everything You Need to Know About 4G Wireless Technology", Techspot Guides, printed at http://www.techspot.com/guides/272-everything-about-4g/, printed on Jun. 8, 2012, 4 pages.
"Global Positioning System," Wikipedia, last modified Jan. 14, 2013, 15 pages (found at http://en.wikipedia.org/wiki/Global_Positioning_System).
"Lapdock™ for Motorola ATRIX," at http://www.motorola.com/Consumers/US-EN/Consumer-Product-and-Services/Mobile . . . , accessed Apr. 18, 2011, 1 page.
"Location-based service," Wikipedia, last modified, Jan. 7, 2013, 10 pages (found at http://en.wikipedia.org/wiki/Location-based_service).
"LTE Advanced," Wikipedia, last modified Dec. 24, 2012, 5 pages (found at http://en.wikipedia.org/wiki/LTE_Advanced).
"LTE (telecommunication)," Wikipedia, printed Jan. 15, 2013, 10 pages (found at http://en.wikipedia.org/wiki/3GPP_Long_Term_Evolution).
"Microsoft Outlook 2010 Product Guide," Microsoft, 2010, 65 pages.
"Moore's law," Wikipedia, printed Jan. 15, 2013, 11 pages (found at http://en.wikipedia.org/wiki/Moore's_law).
"Motorola ATRIX 4G Laptop Dock Review," at http://www.phonearena.com/reviews/Motorola-ATRIX-4G-Laptop-Dock-Review_id2667, Mar. 2, 2011, 6 pages.
"Pandora Radio," Wikipedia, printed Jan. 15, 2013, 7 pages (retrieved from http://en.wikipedia.org/wiki/Pandora_Radio).
"Reliability (computer networking)," Wikipedia, last modified Oct. 24, 2012, 2 pages (retrieved from http://en.wikipedia.org/wiki/Reliability_(computer_networking).
"Roaming Guard," CMI Technologies, Installation and User Manual Version 1.04, 2011, 8 pages.
"RootMetrics. The one true picture of carrier performance." RootMetrics, captured Dec. 22, 2011, 2 pages (retrieved from http://web.archive.org/web/20111222231550/http://www.rootmetrics.com/).
"Transmission Control Protocol," Wikipedia, last modified Jan. 14, 2013, 18 pages (retrieved from http://en.wikipedia.org/wiki/Transmission_Control_Protocol.
"User Datagram Protocol," Wikipedia, last modified Jan. 9, 2013, 6 pages (retrieved from http://en.wikipedia.org/wiki/User_Datagram_Protocol).
"Wi-Fi," Wikipedia, printed Jun. 6, 2012, 7 pages (http://en.wikipedia.org/wiki/Wi-Fi).
"Wireless HDMI," Wikipedia, last modified Sep. 24, 2012, 1 page (found at http://en.wikipedia.org/wiki/Wireless_HDMI).
"Wireless Standard: 4G," printed at http://www.nd.edu/-mhaenggi/NET/wireless/4G/, on Jun. 8, 2012, 6 pages.
Burns, C., "Motorola ATRIX 4G Laptop Dock Review," at http://androidcommunity.com/motorola-atrix-4g-laptop-dock-review-20110220/, Feb. 20, 2011, 5 pages.
Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.
Google images, accessed Apr. 18, 2011, 6 pages.
Google Search "wifi protocol stack", Printed at http://www.google.com/search?q=wifi=protocol+stack&hl=en&qscrl=1&nord=1&rlz=1T4 . . . on Jun. 8, 2012, 15 pages.
Harman03, "Kyocera Echo Dual-screen Android Phone," posted 4 weeks from Apr. 18, 2011, 3 pages.
Mitchell, "Wireless Standards—802.11b 802.11a 802.11g and 802.11n" About.com Guide, Printed at http://compnetworking.about.com/cs/wireless80211/a/aa80211standard.htm on Jun. 8, 2012, 2 pages.
Mok et al. "Location determination using WiFi fingerprinting versus WiFi trilateration," Journal of Location Based Services, Jun. 2007, pp. 145-159 (Abstract Only) (retrieved from http://dl.acm.org/citation.cfm?id=1451884).
Oraskari, "Bluetooth versus WLAN IEEE 802.11x" Product Modelling and Realization Group (PM&RG) Department of Computer Science and Engineering Helsinki University of Technology, jyrki.oraskari@hut.fi 37266J, 5 pages, (2002).
Ravi et al., "4G Mobile Broadband—LTE Network Architecture and Protocol Stack", International Journal of Research and Reviews in Ad Hoc Networks, vol. 1, No. 1, Mar. 2011, 8 pages.
Stein, S., "How does the Motorola Atrix 4G Lapdock compare with a laptop?" Crave—CNET, at http://news.cnet.com/8301-17938_105-20031251-1.html, Feb. 9, 2011, 7 pages.
Vilches, "Everything You Need to Know About 4G Wireless Technology", printed from www.techspot.com/guides/272-everything-about-4g/, Apr. 29, 2010, 12 pages.
Wikipedia, "Bandwidth (computing)", Printed at http://en.wikipedia.org/wiki/Network_bandwidth, on Jun. 6, 2012, 2 pages.
Wikipedia, "Bandwidth optimization", Printed at http://en.wikipedia.org/wiki/Bandwidth_optimization, on Jun. 6, 2012, 2 pages.
Wikipedia, "Bit rate", Printed at http://en.wikipedia.org/wiki/Bit_rate on Jun. 6, 2012, 8 pages.
Wikipedia, "IEEE 802.11", Printed at http://en.wikipedia.org/wiki/IEEE_802.11 on Jun. 8, 2012, 12 pages.
Wikipedia, "Measuring network throughput", Printed at http://en.wikipedia.org/wiki/Bandwidth_test on Jun. 6, 2012, 7 pages.
Wikipedia, "Network performance", Printed at http://en.wikipedia.org/wiki/Comparison_of_latency_and_throughput on Jun. 6, 2012, 7 pages.
Wikipedia "Protocol stack", Printed at http://en.wikipedia.org/wiki/Protocol_stack on Jun. 8, 2012, 4 pages.
Wikipedia, "Quality of service", Printed at http://en.wikipedia.org/wiki/Quality_of_service on Jun. 6, 2012, 11 pages.
Wikipedia, "Throughput", Printed at http://en.wikipedia.org/wiki/Throughput on Jun. 6, 2012, 7 pages.
Wikipedia "WiMAX", Printed at http://en.wikipedia.org/wiki/WiMAX on Jun. 6, 2012, 8 pages.
International Search Report for International (PCT) Patent Application No. PCT/US2011/052563, mailed Feb. 10, 2012 3 pages.
International Search Report for International (PCT) Patent Application No. PCT/US2011/052563, mailed Feb. 12, 2012 3 pages.

International Search Report for International (PCT) Patent Application No. PCT/US2011/052556, mailed Apr. 26, 2012 3 pages.
International Preliminary Report on Patentability for International (PCT) Patent Application No. PCT/US2011/052355, mailed Apr. 11, 2013, 7 pages.
International Preliminary Report on Patentability for International (PCT) Patent Application No. PCT/US2011/052563, mailed Apr. 11, 2013, 6 pages.
International Preliminary Report on Patentability for International (PCT) Patent Application No. PCT/US2011/052556, mailed Apr. 11, 2013, 6 pages.
Official Action for U.S. Appl. No. 12/891,290, mailed May 15, 2013, 15 pages.
International Search Report for International (PCT) Patent Application No. PCT/US2011/052355, mailed Apr. 19, 2012, 3 pages.
Official Action for U.S. Appl. No. 13/186,307, mailed Nov. 7, 2012, 8 pages.
Official Action for U.S. Appl. No. 12/891,438, mailed Sep. 24, 2012, 16 pages.
Official Action for U.S. Appl. No. 12/891,438, mailed Mar. 1, 2013, 19 pages.

* cited by examiner

MULTIPLE MESSAGING COMMUNICATION OPTIMIZATION

BACKGROUND

A growing amount of communication involves the exchange of electronic messages. With advances in technology, the number of electronic messaging modalities has also grown. With a growing number and use of different messaging modalities, communication may become more convenient to a user. However, the increasing number of messaging modalities may result in difficulties associated with managing, tracking, and organizing message data that is exchanged electronically, especially when multiple messaging modalities or multiple devices are employed. These difficulties are further compounded as the amount of message data to manage, track, and organize increases. As such, the overall communication effectiveness of users may be diminished.

For instance, the incorporation of messaging modalities into mobile communication devices may enable users to use a mobile device to exchange electronic messages. Many mobile devices in use today have the ability to communicate using a number of messaging modalities including, but not limited to, voice communication, voice over Internet Protocol (VoIP), voicemail, email, short message service (SMS or "text message"), multimedia messaging service (MMS), instant messaging or other chat protocols, video calling, social media posts (e.g., Twitter®, Facebook®, etc), or any combination thereof. Depending on, for example, the nature of the communication, the recipient(s) of the communication, the location of the user, and/or the user's preference, a user may choose any one of or a plurality of different messaging modalities to exchange messages. As such, related message data may be spread among a number of messaging modalities or devices such that it may be difficult for a user to quickly and easily access related messages (e.g., messages belonging to a common message thread).

This may present difficulties when a user attempts to search messages. The message data a user desires to search may be spread among a plurality of messaging modalities and/or devices. Furthermore, traditional keyword searching may prove ineffective to find related messages due to potential synonymy and polysemy of the vocabulary used in messages. As such, keyword searching may return unrelated messages or overlook related messages due to variations in the terms used. As such, the users communication effectiveness may be further reduced.

SUMMARY

A first aspect includes a method for use of a communication system. The method includes storing a plurality of portions of message data in machine readable format on at least one storage device. The plurality of portions of message data correspond to messages exchanged via one or more electronic messaging modalities. The method further includes performing a semantic analysis on said plurality of portions of message data. The method also includes identifying, based on said semantic analysis, at least two related portions of said plurality of portions of message data. The method further includes notifying a user of said at least two related portions by way of a notice provided on a user interface.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For example, in one embodiment, the method further includes indexing said plurality of portions of message data. The method may also further include representing corresponding content of each said plurality of portions of message data as a vector. The vector may be stored in the indexing operation. The vector may be defined in multi dimensional Euclidian space.

Additionally, the semantic analysis may include evaluating a relationship between at least a first vector and a second vector. The relationship may describes the relatedness of said first vector and said second vector. The semantic analysis may include performing a distance analysis with respect to said first vector and said second vector. The identifying may be based on the relationship such that if said relationship exceeds a threshold value, a first portion of message data corresponding to said first vector and a second portion of message data corresponding to said second vector comprise said at least two related portions.

In one embodiment, the first portion of message data may be associated with a first messaging modality and said second portion of message data may be associated with a second messaging modality different than said first messaging modality. The first messaging modality and the second messaging modality may be individually chosen from the group comprising voice communication, VoIP, voicemail, email, text messaging, multimedia messaging, instant messaging, video calling, social media posts, or any combination thereof.

The first portion of message data may be stored on a first device and said second portion of message data is stored on a second device. The method may also include accessing at least one of said first portion of message data or said second portion of message data from said notice provided by said user interface. At least one of said first portion of message data or said second portion of message data may be transcribed from a first form to a second form prior to performing said semantic analysis. The first form may include audio data and said second form may be textual data.

A second aspect includes a communication system. The system includes a semantic analysis module that has access to at least first portion of message data and second portion of message data. The semantic analysis module is operable to calculate a first vector corresponding to content of said first portion of message data and a second vector corresponding to content of said second portion of message data. The semantic analysis module is further operable to determine a relationship between said first vector and said second vector. If said relationship exceeds a predetermined threshold said first portion of message data and said second portion of message data are identified as being related. The system also includes an alert module in operative communication with said semantic analysis module such that if said first vector and said second vector are identified as being related, the alert module is operative to notify a user that said first portion of message data and said second portion of message data are related.

A number of feature refinements and additional features are applicable to the second aspect. These feature refinements and additional features may be used individually or in any combination. As such, each of the following features that will be discussed may be, but are not required to be, used with any other feature or combination of features of the any of the second aspects.

For example, at least one of said first portion of message data or said second portion of message data may be stored locally with respect to the semantic analysis module. Additionally or alternatively, at least one of said first portion of message data and said second portion of message data may be stored remotely with respect to the semantic analysis module. In one embodiment, the first portion of message data may be associated with a different messaging modality than said second portion of message data.

In one embodiment, at least one of said first portion of message data and said second portion of message data comprise body data of a corresponding message. Additionally or alternatively, at least one of said first portion of message data and said second portion of message data may comprise metadata of a corresponding message.

A third aspect includes a method for a mobile computing device operative to access at least a first portion of message data associated with a first messaging modality and a second portion of message data associated with a second messaging modality. The method includes calculating a first vector describing said first portion of message data and a second vector describing said second portion of message data and comparing said first and second vector to quantify a distance relationship between said first vector and said second vector. The method also includes presenting a cross-modal alert to a user based on said distance relationship. The cross-modal alert provides access to information regarding said first portion of message data and said second portion of message data.

DETAILED DESCRIPTION

Figure 1:
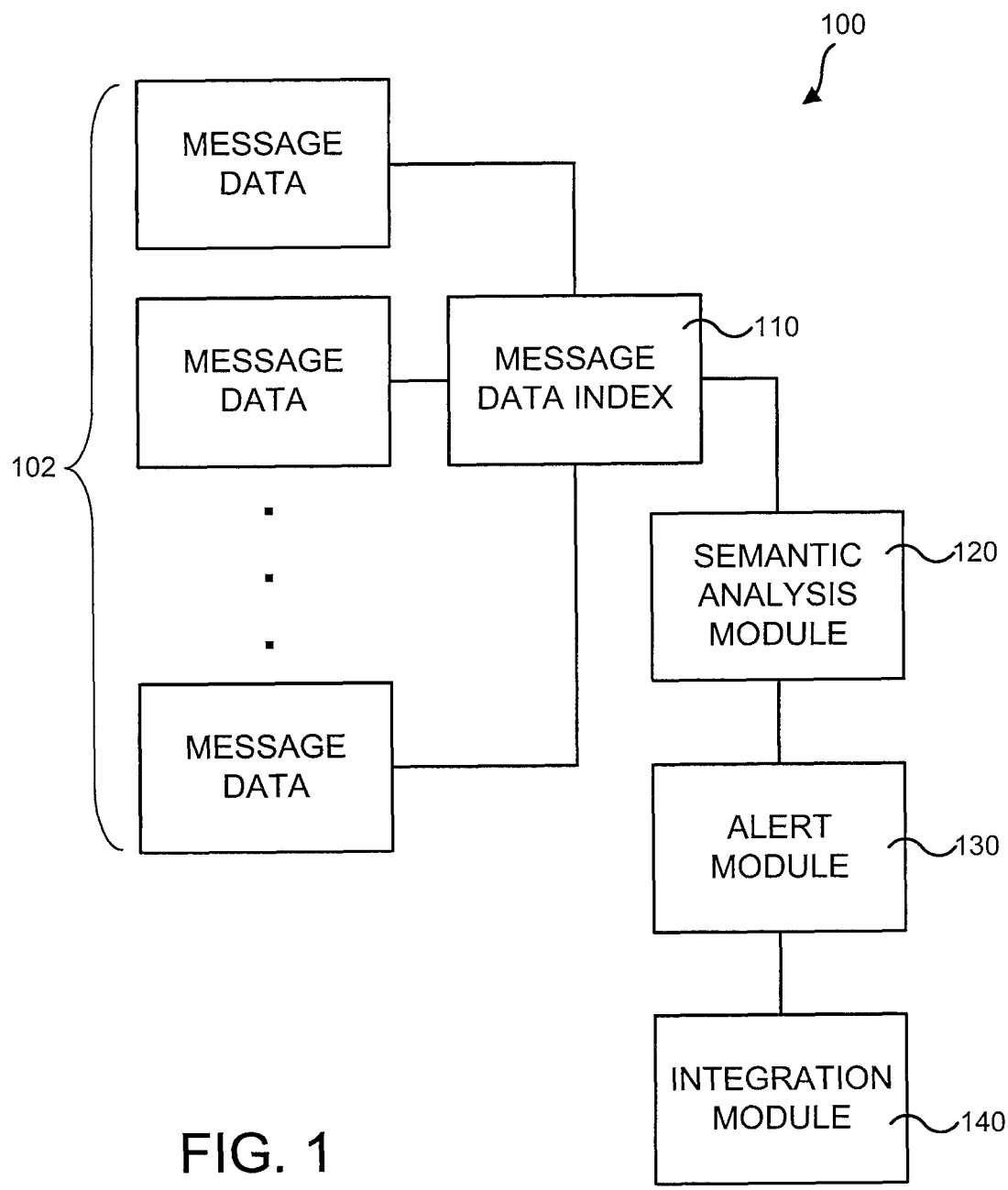
FIG. 1 is a schematic view of an embodiment of a communication system according to the present invention.

The present disclosure is generally related to systems and methods for use of multiple communication messaging systems. Specifically, message data may be analyzed to determine the relatedness of different portions of message data. For instance, a semantic analysis technique may be used to analyze a plurality of portions of message data. Related message data may be identified as a result of the semantic analysis and a user may be notified of any portions of message data related to, for example, a message of interest. The related portions of message data may also be accessed (e.g., read) by the user. The message data analyzed may be associated with a plurality of different messaging modalities such as, for example, cellular voice communication, voicemails, emails, text messages, MMS messages, instant messages, chats, VoIP communication, video calling, social media posts (e.g., to Twitter®, Facebook®, etc.), or any combination thereof. Furthermore, the message data may be generated using (or stored on) a plurality of different devices (e.g., personal computers, mobile phones, personal digital assistants, tablets, etc.). The identification of related portions of message data may provide for a more robust evaluation of potentially large amounts of message data spread across a number of different communication modalities and/or a number of different devices to retrieve related messages and help prevent overlooked, unread, or lost messages. Furthermore, in contrast to keyword searches, the present invention facilitates a more robust semantic analysis to identify related message data that accounts for potential variations (e.g., synonymy and/or polysomy) in the language in related portions of message data.

Identifying related portions of message data that have been sent or received may include storing machine readable portions of message data. Portions of message data may correspond to at least a portion of a message. That is, a portion of message data may not, but may encompass the entire message. As such, a message may have a plurality of portions of message data which is stored. These stored portions of message data may be indexed such that a representation of the content of the message data is stored (e.g., locally or remotely) in a message data index.

As an example, a message thread (i.e., a series of messages exchanged related to or regarding a similar topic or conversation) may be exchanged using more than one messaging modality or more than one device. Due to, for instance, use of multiple different messaging modalities or multiple different devices, messages in the message thread may be overlooked, unread, or lost. For sensitive communication (e.g., such as that associated with business transactions, legal affairs, diplomatic communication, etc.), it may be important for a user to be notified of or be able to easily access related messages. The fact that much electronic communication may occur rapidly (e.g., near instantaneously in some instances) serves to further complicate the ability to effectively manage messages. For instance, in the time it takes to generate and send a reply to an original message, a subsequent related message may be received, of which the user is unaware.

In another example, a user may send a text message from a mobile device in a first instance. The receiver of the text message may respond to the sender via an email. The sender may receive the email reply on a laptop computer. A response to the reply may in turn be sent using a chat program on a tablet device. As such, three different messaging modalities using at least three different devices were used to carry out the message thread in this example provided. Especially when considering the possibility that a number of different parallel message threads may exist, the ability to manage, track, or organize related messages may become burdensome.

In this regard, the indexing of messages may allow for a representation (e.g., a vector existing in Euclidian space having multiple dimensions) to be generated or calculated that describes the content of a portion of message data. In turn, a comparison (e.g., a distance analysis) may be carried out on a plurality of the representations. Based on one or more thresholds regarding the relationship between the representations of the various portions of message data, vectors exhibiting a relationship that exceeds the one or more thresholds may be determined to be related. As such, a user may be presented with an alert notifying him or her of the related messages corresponding to the representations that exhibit a relationship exceeding a threshold. The alert may be presented to a user upon a number of different events or upon request by the user.

Reference will now be made to the accompanying drawings, which at least will assist in illustrating the various pertinent features of the present invention. In this regard, the following description is presented for purposes of illustration and description and is not intended to limit the invention to the form disclosed herein. Consequently, variations and modifications commensurate with the following teachings, skill, and knowledge of the relevant art, are within the scope of the present invention. The embodiments described herein are further intended to enable others skilled in the art to utilize the invention as described or in other embodiments and with various modifications required by the particular applications or uses of the present invention.

With reference to FIG. 1, a schematic view of an embodiment of a system 100. The system 100 may include a message data index 110. The message data index 110 may be operable to store an index of representations of the content of a plurality of portions of message data 102. Some or all of the plurality of portions of message data 102 may correspond to the same messaging modality or may correspond to different messaging modalities. Furthermore, some or all of the plurality of portions of message data 102 may be stored on the same device or may be stored on different devices. In any regard, the plurality of message data portions 102 may be indexed in a message data index 110. Additionally, while not shown, a plurality of message data indexes may be provided (e.g., a separate message data index for each corresponding message data portion, each messaging modality, or each of a number of devices). Accordingly, a message data index 110 may be stored locally or remotely with respect to a semantic analysis module 120, as will be described in more detail below.

In one embodiment, a representation of the content of each of the plurality of portions of message data 102 may be stored in the messaging data index 110. The representations of the content of the plurality of portions of message data 102 may take a number of forms. For example, a mathematical construct such as a matrix, vector, or the like may be used to represent the content of the plurality of portions of message data.

A semantic analysis module 120 may be operative to access the message data index 110. As stated above, the message data index 110 may be stored locally or remotely with respect to the semantic analysis module 120. As such, the message data index 110 may reside on the same device on which the semantic analysis module 120 executes or may reside on a device separate from the device on which the semantic analysis module 120 executes. The semantic analysis module 120 may utilize the representations of the content of the plurality of portions of message data 102 stored in the message data index 110 in order to compare the different plurality of portions of message data 102 to identify related messages.

In one particular embodiment, the semantic analysis module 120 may access the message data index 110 and retrieve a representation of at least two of the plurality of portions of message data 102. In one embodiment, the semantic analysis module 120 may be operative to access a local message data index 110, for example, residing in a memory of the device executing the semantic analysis module 120. Alternatively or additionally, the semantic analysis module may be operative to access a remote memory to retrieve information. The remote memory may be associated with another device used to exchange messages or may comprise a remote data repository. In this regard, the semantic analysis module 120 may be in operative communication with the remote memory (e.g., via a wireless or wired network or the like). In the case of a remote data repository, any device a user utilizes to exchange messages may be operative to store message data or representations of the content thereof at the remote data repository. Accordingly, regardless of the device used to communicate, a copy of message data or a representation of the content thereof may be stored at the remote data repository.

The representations retrieved by the semantic analysis module 120 may be a vector describing a corresponding portion of message data 102 in Euclidian space. For example, the vector may be generated by way of mathematical operations performed on a matrix describing the usage of terms which comprise the body or metadata of the message data. The Euclidian space may have a plurality of dimensions in which a vector may have a component. Such Euclidian space is not limited to any number of dimensions such that the number of dimensions may be selected based on a number of factors (e.g., the amount of message data indexed, etc.). As each portion of message data 102 may have a corresponding vector which describes content of that portion of the message data, the relatedness of the plurality of portions of message data 102 may be analyzed by comparing the relationship between the corresponding vectors.

The relatedness of one or more portions of message data 102 may be described by a relationship between vectors corresponding to the one or more portions of message data 102. In one embodiment, a distance analysis may be performed on at least two vectors to determine the relationship between the at least two vectors. A threshold relationship between vectors may be established such that vectors having a relationship that exceeds the threshold (e.g., within a certain distance of one another) may be identified as having a relationship above the threshold. Vectors exceeding the threshold relationship indicate the message portions to which the vectors correspond are related. As such, the semantic analysis module 120 may be operative to compare the relatedness of message data by measuring a relationship between vectors corresponding to the message data portions to determine the relatedness of the messages. Other means of quantifying or describing the relationship between vectors may be used (e.g., relative angular positions, relative lengths, etc.). Threshold relationships may likewise be determined for these other means of describing the relationship between vectors to identify related message portions.

In one embodiment, the semantic analysis module 120 may perform a semantic analysis technique similar to that described in U.S. Pat. No. 4,839,453, the entirety of which is incorporated by reference. Alternative methods of analysis including, but not limited to, latent semantic indexing, latent semantic analysis, probabilistic latent semantic analysis, probabilistic latent semantic indexing, n-gram analysis, topic-based vector space models, latent dirichlet allocation or other appropriate type of semantic analysis or information retrieval technique may be employed by the semantic analysis module 120 as well, without limitation.

In any regard, an alert module 130 may be in operative communication with the semantic analysis module 120. The alert module 130 may be operative to provide an alert to a user when related messages are identified by the semantic analysis module 120. The alert module 130 may be operative to generate an alert which is presented to the user (e.g., by way of a user interface). The alert presented to the user by the alert module 130 may notify the user that portions of message data exist that are related to a message of interest.

The alert module 130 may be responsive one or more of a plurality of events. A message of interest may be identified for such an event. The message of interest may comprise message data to which the plurality of portions of message data 102 is compared. The message of interest may be compared to the plurality of portions of message data 102 to identify portions of message data related to the message of interest. In one embodiment, the alert module 130 may be responsive to the sending of a message by a user. The message of interest in this embodiment may be the outgoing message. As such, prior to sending the message of interest, the semantic analysis module 120 may perform an analysis on the message of interest against the message data index 110 to identify portions of message data 102 related to the message of interest. Thus, the user may be alerted to the presence of related portions of messages data prior to the sending of the message of interest.

In another example, a user may select a message to read. In this regard, the selected message may be identified as a message of interest. Again, the semantic analysis module 120 may perform an analysis on the message of interest against the message data index 110 to indentify portions of message data related to the message of interest. As such, upon selecting a message to read, an alert may be generated by the alert module 130 informing the user of related portions of message data. Other events may also result in an alert from the alert module. Examples may include alerting a user upon identifying related message portions to a message when the message is received. In this case, the received message may be the message of interest. Additionally or alternatively, the user may be alerted to related messages upon other actions taken with respect to a message (e.g., deletion of a message, forwarding of a message, replying to a message, indicating interest or approval of a message, etc.). Additionally, the user may be able to manually select a message in order to find a related portions of message data.

The alert module 130 may also be in operative communication with integration module 140. The integration module 140 may be operative to integrate related portions of message data 102 and present the related portions of message data 102 to the user. For example, the user may access the related portions of message data 102 presented in an alert generated by the alert module 130. The integration module 140 may be operative to access the related portions of message data. As such, in examples presented above, when a user receives an alert regarding related portions of message data, the user may access the related portions of message data or the messages from which the related portion is taken.

The modules described above, including the semantic analysis module 120, alert module 130, and integration module 140, may be characterized by software, firmware, or hardware of any kind which is capable of functioning in the manner described above. Furthermore, functionality of the modules described above may be integrated into less modules than described or may be separated into additional modules. In one particular embodiment, the modules may comprise one or more portions of machine readable code stored in at least one memory that is accessible by one or more microprocessors to perform the functionality described above.

Figure 2:
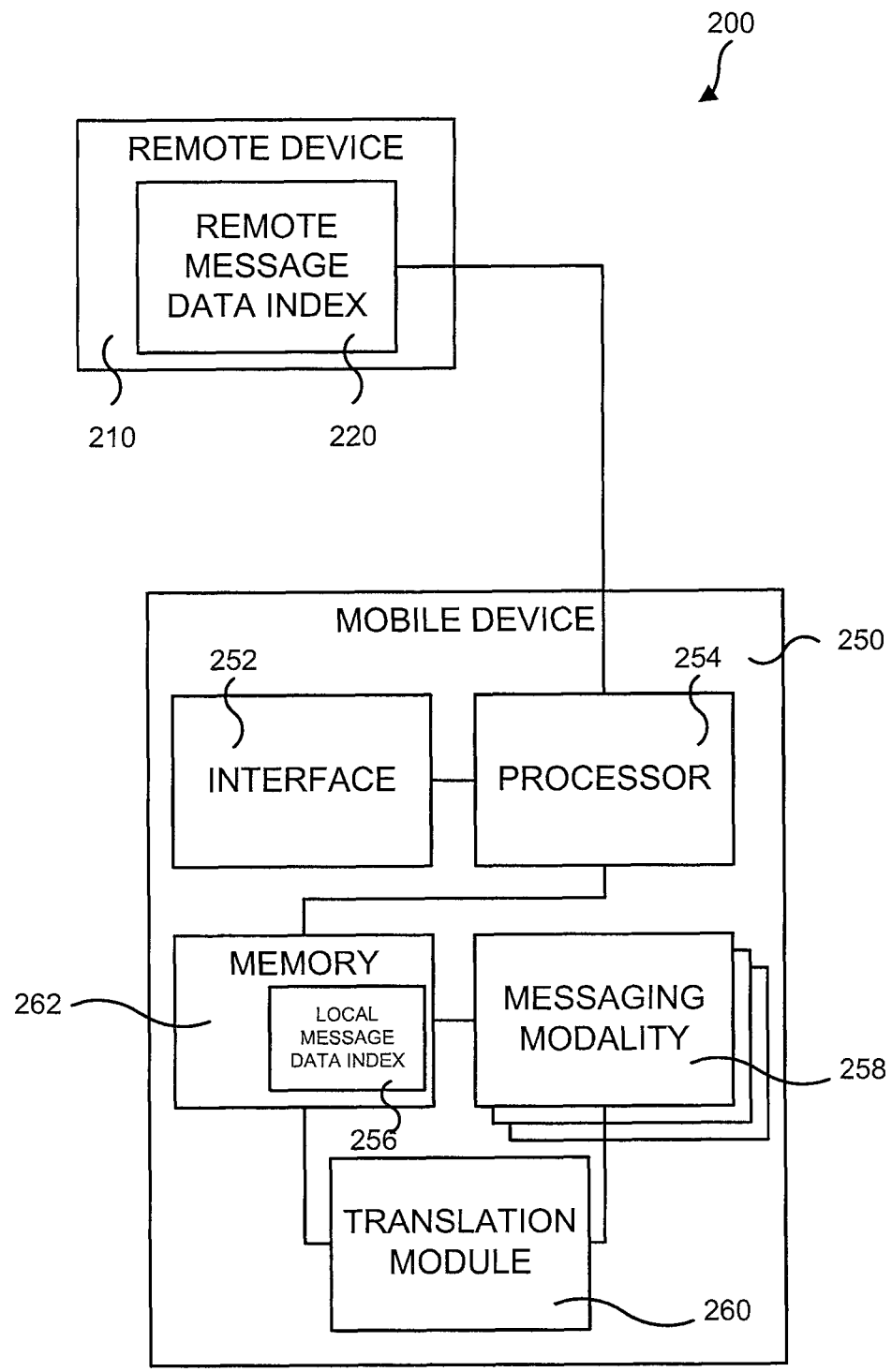
FIG. 2 is a schematic view of another embodiment of a communication system according to the present invention that may employ a mobile device for communication via a plurality of communication modalities.

Turning to FIG. 2, another embodiment of a system 200 according to the present invention is depicted. This system 200 may include a mobile device 250. The mobile device 250 may include a processor 254 (e.g., a microprocessor or the like). The processor 254 may be operative to control operations of the mobile device 250. The processor 254 may encompass a plurality of hardware, software, and/or firmware components such as a plurality of specific purpose microprocessors, communication chipsets, etc. The processor 254 may also be operative to execute a number of modules, such as a semantic analysis module 120, an alert module 130, and an integration module 140 shown and described above with regard to FIG. 1. Accordingly, these modules may comprise software in the form of machine readable code that is executed by the processor 254 and stored locally in a memory 262 of the mobile device 250.

The mobile device 250 may be operable to send or receive messages via a plurality of messaging modalities 258. For example, the processor 254 may execute clients (e.g., communication programs or other applications executable by the processor 254) operative to communicate according to messaging modality protocols. The messaging modalities 258 of the mobile device 250 may include, but are not limited to, voice communications, VoIP, voicemail, email, text messages, MMS messages, instant messages, chat transcripts, video calling, social media posts, other messaging modalities now available or later developed, or any combination thereof. When receiving or sending messages by way of messaging modalities 258, a machine readable record corresponding to the message may be stored (e.g., in memory 262) on the mobile device 250. Additionally or alternatively, a machine readable record corresponding to messages may be stored remotely (e.g., at remote device 210) at a data repository or the like.

The processor 254 as shown in FIG. 2 may be in operative communication with a local message data index 256 stored in the memory 262. The local message data index 256 may include representations (e.g., vectors) representative of the content of a plurality of portions of message data which reside locally in the memory 262 of the mobile device 250. In this regard, representations of a plurality of portions of message data (e.g., such as those described above with regard to FIG. 1), may be stored in the local message data index 256. As such, the processor 254 may access the local message data index 256 and perform a semantic analysis on the representations stored in the local message data index 256 (e.g., in a similar regard to the semantic analysis operation described above with regard to the operation of the semantic analysis module 120 of FIG. 1).

The processor 254 may also be in operative communication with remote message data index 220 located at a remote device 210. For example, the remote device 210 may be another device owned or controlled by a user of the mobile device 250. Additionally or alternatively, the remote device 210 may be a server or the like for storing the remote message data index 220 (e.g., the remote device 210 may serve as a data repository). In various embodiments, the remote device 210 may be a computer at the user's work, a computer at the user's home, a tablet, or other device the user may use to send or receive messages. In this regard, the remote device 210 may also have a plurality of messaging modalities associated therewith for sending and receiving messages. Alternatively, the remote device 210 may serve only as a data repository for storing the remote message data index 220. In any regard, the remote message data index 220 and/or the local message data index 256 may be accessible by the processor 254 of the mobile device 250.

The processor 254 of the mobile device 250 may be operative to perform a semantic analysis (such as the semantic analysis operation described above in FIG. 1) with respect to local message data index 256 residing locally at the mobile device 250 as well as remote message data index 220 residing remotely at the remote device 210. Additionally, the mobile device may also have an interface 252 through which a user interacts with the mobile device 250. The interface 252 may be in operative communication with the processor 254. Accordingly, an alert module and/or interface module (such as those described above with respect to FIG. 1) executed by the processor 254 may be operative to communicate with the interface 252 to present an alert and/or integration features to a user (such as those described above with respect to FIG. 1).

Also depicted in FIG. 2 is a translation module 260. A translation module 260 may be operative to translate message data from a messaging modality 258 into machine readable form for processing and/or storage in a message data index (e.g., local message data index 256 and/or remote data index 220). The translation of message data into machine readable form may include performing translations on the message data such that the data is in a form which is amenable to analysis by a semantic analysis module. In one example, a translation module 260 may be used to convert audio data (e.g., voice communication, a voice mail, VoIP data, video calling data, etc.) into text form for storage in a memory 262 (e.g., so that the text form may be used to produce representations of the content of messages in message data index 220 or 256). As such, the translation module 260 may, in one embodiment, include speech-to-text technology. Alternatively or additionally, the translation module 260 may include optical character recognition technology for converting image data into text data. In any regard, the output of the translation module 260 may be in an appropriate format for indexing as described above.

Figure 3:
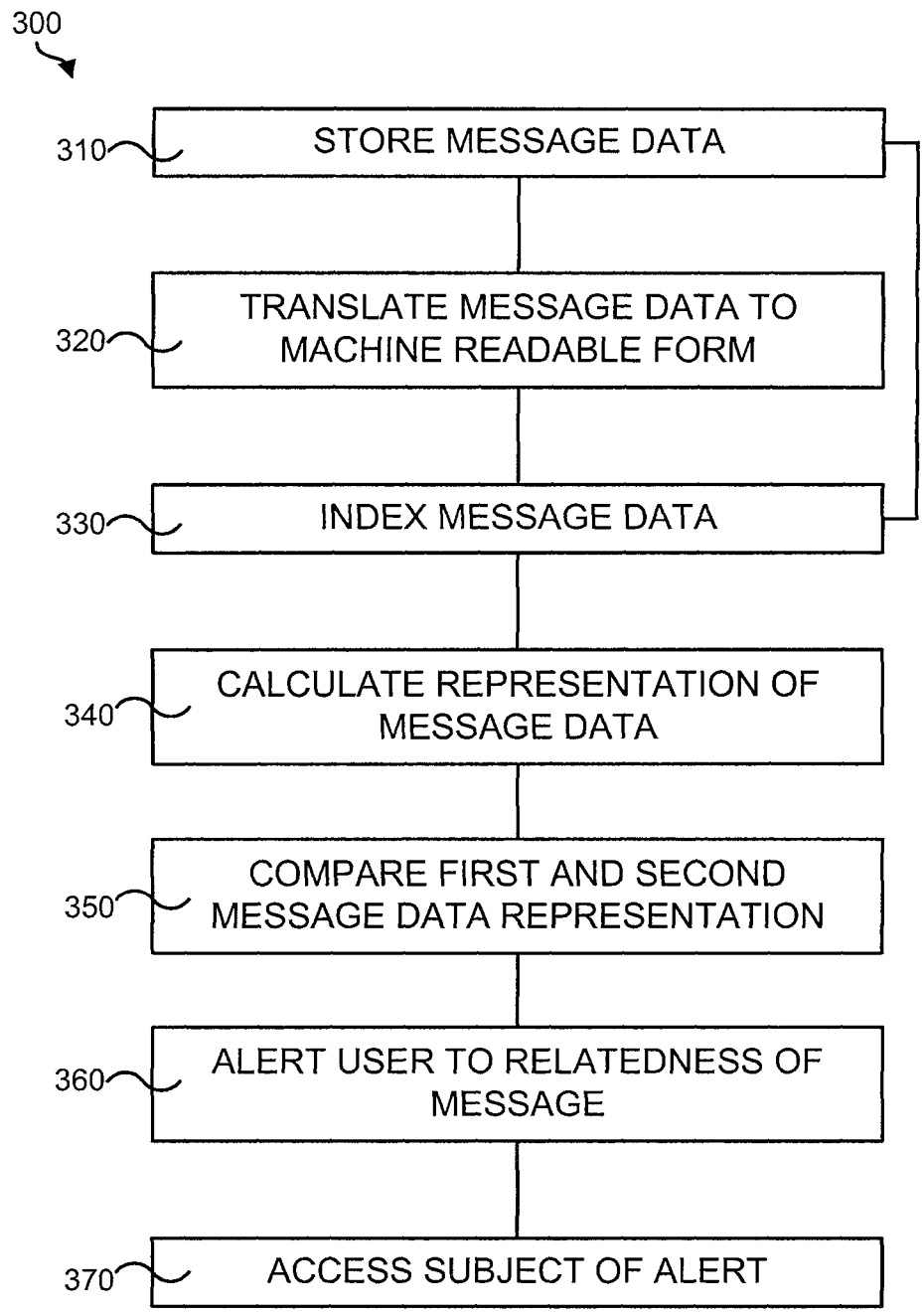
FIG. 3 is a flow chart depicting an embodiment of a method according to the present invention.

FIG. 3 depicts a process 300 which may be performed to identify related message data. The process 300 may begin by storing message data 310. As discussed above, the message data may comprise portions of messages or entire messages stored in machine readable form. The message data may be stored locally at a device executing the process 300, remotely from the device executing the process 300, or a combination thereof. The process 300 may have an optional step of translation 320 of message data to machine readable form as described above. For example, message data corresponding to voice communications (e.g., telephone calls or voice messages) may be converted into text which is then stored.

The process 300 may further include indexing the message data 330. The indexing may include generation of a matrix, vector, or other mathematical construct which represents the content of the message data. As such, the process 300 may further include calculating 340 a representation of the content of a plurality of portions of message data to be stored in the index. The process may further include comparing 350 first and second message data representations. For example, the comparing step 350 may include performing a distance analysis on a plurality of vectors representing portions of message data.

The process 300 may further include alerting 360 a user to relatedness of messages as determined in the comparing operation 350. Additionally, the process 300 may include accessing 370 the subject messages of the alert. In this regard, the alert may include the ability to access the related messages identified in the comparing step 350 such that the user may view the related messages as presented by the alert. For example, the alert may include a portion of the related message data, a link to the related message, or other means of accessing the related message.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for use of a communication system, comprising:
    storing a plurality of portions of message data in machine readable format on at least one storage device, said plurality of portions of message data corresponding to messages exchanged via one or more electronic messaging modalities;
    performing a semantic analysis on said plurality of portions of message data;
    identifying, based on said semantic analysis, at least two related portions of said plurality of portions of message data;
    representing corresponding content of each said plurality of portions of message data as a vector; and
    notifying a user of said at least two related portions by way of a notice provided on a user interface;
    wherein performing said semantic analysis includes evaluating a relationship between at least a first vector and a second vector, said relationship describes the relatedness of said first vector and said second vector and performing a distance analysis with respect to said first vector and said second vector; and
    wherein said identifying is based on said relationship such that if said relationship exceeds a threshold value, a first portion of message data corresponding to said first vector and a second portion of message data corresponding to said second vector comprise said at least two related portions.

2. A method as recited in claim 1, wherein said method further includes indexing said plurality of portions of messages data.

3. A method as recited in claim 1, wherein said vector is defined in multi dimensional Euclidian space.

4. A method according to claim 1, wherein said first portion of message data is associated with a first messaging modality and said second portion of message data is associated with a second messaging modality different than said first messaging modality.

5. A method according to claim 4, wherein said first messaging modality and said second messaging modality are individually chosen from the group comprising voice communication, VoIP, voicemail, email, text messaging, multimedia messaging, instant messaging, video calling, social media posts, or any combination thereof.

6. A method according to claim 5, wherein said first portion of message data is stored on a first device and said second portion of message data is stored on a second device.

7. A method according to claim 6, further comprising:
    accessing at least one of said first portion of message data or said second portion of message data from said notice provided by said user interface.

8. A method according to claim 1, wherein at least one of said first portion of message data or said second portion of message data is transcribed from a first form to a second form prior to performing said semantic analysis.

9. A method according to claim 8, wherein said first form includes audio data and said second form is textual data.

10. A communication system, comprising:
    a computer processor coupled to a memory;
    a semantic analysis module that has access to at least first portion of message data and second portion of message data, said semantic analysis module calculates a first vector corresponding to content of said first portion of message data and a second vector corresponding to content of said second portion of message data, wherein said semantic analysis module further determines a relationship between said first vector and said second vector, wherein if said relationship exceeds a predetermined threshold said first portion of message data and said second portion of message data are identified as being related; and
    an alert module in operative communication with said semantic analysis module such that if said first vector and said second vector are identified as being related, said alert module notifies a user that said first portion of message data and said second portion of message data are related.

11. A communication system according to claim 10, wherein at least one of said first portion of message data or said second portion of message data is stored locally with respect to the semantic analysis module.

12. A communication system according to claim 11, wherein at least one of said first portion of message data and said second portion of message data is stored remotely with respect to the semantic analysis module.

13. A communication system according to claim 12, wherein said first portion of message data is associated with a different messaging modality than said second portion of message data.

14. A communication system according to claim 13, wherein at least one of said first portion of message data and said second portion of message data comprise body data of a corresponding message.

15. A communication system according to claim 14, wherein at least one of said first portion of message data and said second portion of message data comprise metadata of a corresponding message.

16. A method for a mobile computing device operative to access at least a first portion of message data associated with a first messaging modality and a second portion of message data associated with a second messaging modality, the method comprising:
- calculating a first vector describing said first portion of message data and a second vector describing said second portion of message data;
- comparing said first and second vector to quantify a distance relationship between said first vector and said second vector;
- presenting a cross-modal alert to a user based on said distance relationship;
- wherein said cross-modal alert provides access to information regarding said first portion of message data and said second portion of message data.

* * * * *

UNITED STATES PATENT AND TRADEMARK OFFICE
CERTIFICATE OF CORRECTION

PATENT NO. : 8,499,051 B2
APPLICATION NO. : 13/188335
DATED : July 30, 2013
INVENTOR(S) : Richard Pocklington Page 1 of 1

It is certified that error appears in the above-identified patent and that said Letters Patent is hereby corrected as shown below:

In the Claims

Column 10, claim 2, lines 16-17, replace "messages" with --message--.

Signed and Sealed this
Third Day of December, 2013

Margaret A. Focarino
*Commissioner for Patents of the United States Patent and Trademark Office*